United States Patent [19]

Korth

[11] Patent Number: 4,641,971
[45] Date of Patent: Feb. 10, 1987

[54] WHITE LIGHT INTERFEROMETER

[75] Inventor: Hans-Erdmann Korth, Stuttgart, Fed. Rep. of Germany

[73] Assignee: International Business Machines Corporation, Armonk, N.Y.

[21] Appl. No.: 676,952

[22] Filed: Nov. 30, 1984

[30] Foreign Application Priority Data

Dec. 27, 1983 [EP] European Pat. Off. ........ 83113120.6

[51] Int. Cl.$^4$ ............................................. G01B 9/02
[52] U.S. Cl. .................................. 356/357; 356/359; 358/107
[58] Field of Search ...................... 356/357, 359, 360; 358/81, 82, 107

[56] References Cited

U.S. PATENT DOCUMENTS 3,359,852 12/1967 Wilczynski et al. ................. 356/359
4,254,337 3/1981 Yasujima et al. ................. 356/357 X Primary Examiner—Davis L. Willis
Assistant Examiner—Matthew W. Koren
Attorney, Agent, or Firm—Thomas R. Berthold

[57] ABSTRACT

A conventional interferometer arrangement (e.g., test glass 12) is illuminated with white light and the resultant colored interference field is recorded by a color TV camera (16). The three output signals (R, G, B) of the color TV camera are directly, or after linear combination, converted into digital values and subsequently serve to address a digital storage (179) in which the phase difference of the interfering waves is stored for each R, G, B combination. The values read from storage are reconverted into analog signals and displayed as so-called pseudo-interference fringes on a TV monitor (18). A computer (19) for the further processing of the read data may be connected to the storage output.

9 Claims, 5 Drawing Figures

WHITE LIGHT INTERFEROMETER

BACKGROUND OF THE INVENTION

This invention relates to an interferometer, and in particular to an interferometer which utilizes white light.

Optical interferometer arrangements have been used for a long time for the point-by-point or the large-area determination of surface topographies or layer thicknesses, as they permit highly accurate, non-destructive and fast measurements. Examples of such arrangements are the interferometers according to Michelson or Mach-Zehnder. The known interferometers are generally operated with monochromatic light, so that the resultant interference fringe pattern may be more readily evaluated. The evaluation accuracy of such interference images is of the order of fractions of half a wavelength (the spacing of two adjacent interferometer fringes) and may be increased by electronic means to a value of $\lambda/100$. A typical disadvantage of interferometers operating with monochromatic light is that only the phase differences of interfering waves corresponding to a maximum path difference of $\lambda/2$ may be uniquely measured, since larger phase differences (i.e. larger vertical deviations or changes in layer thickness) result in the same interference pattern. Apart from this, surface structures with hills and hollows look identical in monochromatic interference images.

For overcoming those disadvantages, several modifications of monochromatic interferometers are known from the art, e.g., using obliquely incident light to increase the unique measuring range, periodic movements to distinguish between hills and hollows, etc.

Another typical concept of providing unique interferometric measurements consists in the use of several wavelengths or of white light in lieu of monochromatic light. In that case, there are colored fringe patterns, e.g. the known Newton rings, instead of the known black-white fringes or bands. Although the evaluation of these colored interference phenomena (according to color and amplitude) permits in principle unique measurements of height profiles or layer thicknesses, it is elaborate when applied individually and therefore has only been used on a limited scale.

An example of evaluating colored interference fringes for layer thickness measurements is described by S. Tolansky in the book "Multiple-Beam Interference Microscopy of Metals", London/New York 1970, p. 141 et seq. According to this example, the colored interference fringes are spectrally analyzed, determining the layer thickness and the layer gradients (ascending or descending portion of a surface) from the spacing of the dark interference fringes, the so-called Mueller fringes, appearing in the spectrum. However, this method is only suitable for analyzing line-shaped surface sections but not the entire surface, an analysis of which would be highly time-consuming.

SUMMARY OF THE INVENTION

Therefore, it is the object of the present invention to provide an interferometer of the above-described kind which, having a simple design, simultaneously provides unique measuring results for all points of an areal test object and which operates at a very high resolution.

In the arrangement proposed herein, a commercial color TV camera records the colored interference pattern generated in a conventional interference arrangement illuminated by white light. The three electrical output signals of the color TV camera corresponding to the three color separations red, green and blue represent for each point of the interference field three sample values of the colored interference curve, from which the phase difference beween the waves contributing to the interference may be determined. The phase differences associated with each color combination are different for each interferometer type and may be determined by computation. The computed results are stored in the form of electrically accessible tables which are addressed by means of the output signals of the color TV camera for reading the associated phase difference value.

The phase difference (or the layer thickness or the height difference of a surface) thus determined for each point of the interference field may subsequently be coded as a color value and used to control a color TV monitor which then displays an artificially generated layer thickness or surface profile of the tested object. This profile may also be electronically superimposed on the image of the tested object.

The use of electronic storages for accommodating tables, which are computed taking account of the characteristic properties of the arrangement or the test object, permits flexibly adapting to a plurality of measuring problems. The circuit expense is low, as only commercially available components are used, such as analog circuits which are also employed in standard TV transmission. The colored interference image is evaluated in real time.

The interferometric measurements by means of the arrangement proposed herein provide absolute values of height differences or layer thicknesses and permit a clear distinction between ascending and descending regions or layers that become progressively thicker or thinner. The use of further electronic storages with selectively connectable correction factors, e.g., for layers with unknown refractive indices, widens the arrangement's range of application.

Examples of the proposed interferometer arrangement will be described in detail below with reference to the accompanying drawings.

DESCRIPTION OF THE PREFERRED EMBODIMENT

Figure 1:
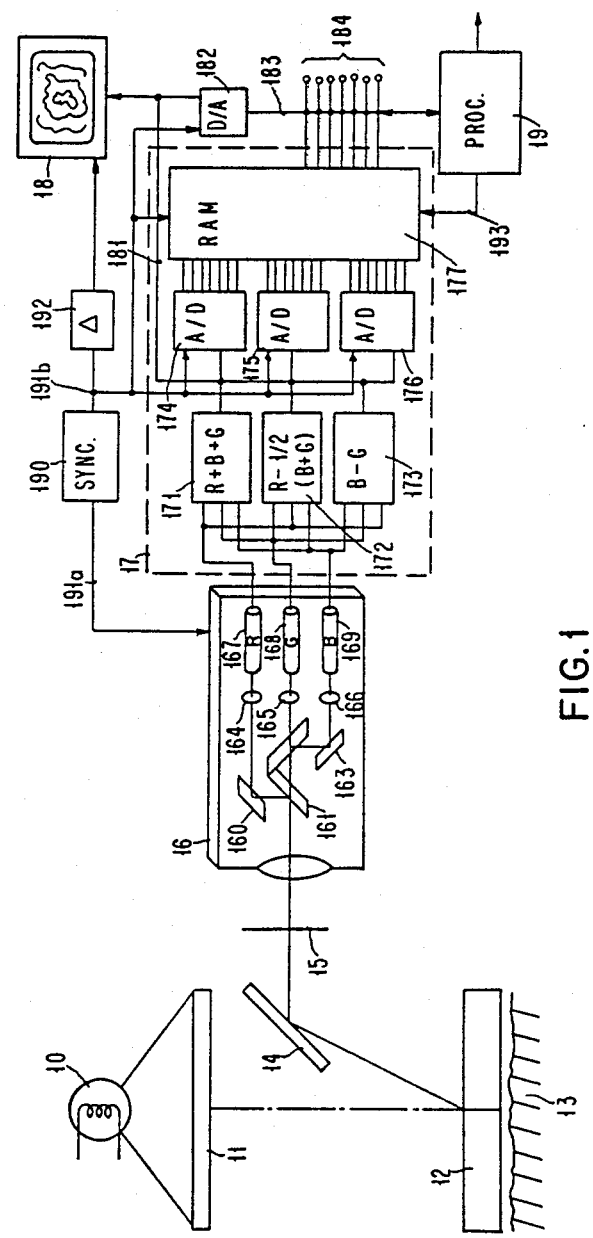
Fig. 1 is a block diagram of the typical design of a white light interferometer arrangement according to the present invention.

FIG. 1 shows a block diagram of the typical design of a white light interferometer of the kind proposed herein by way of one of the simplest interference arrangements, the so-called test glass method. A surface 13 to be tested for smoothness is covered with a plane glass plate 12 and subjected to large-area illumination with white light generated, for example, by an incandescent lamp 10 and a connected optical diffuser (scatter plate) 11. By interference between the light beams which are respectively reflected at the surface 13 and the bottom side of the plane-parallel glass plate 12, colored interference fringe patterns are produced in a known manner which are recorded by a commercially available color TV camera 16 via a deflection mirror 14. Optionally, an optical filter 15, such as an interference filter, whose function will be described in greater detail further on, may be arranged between the deflection mirror 14 and the camera 16.

The color TV camera 16 is provided in a known manner with three pick-up tubes 167, 168, to 169, each of which receives one color separation (for the primary colors red, R; green, G; blue, B) of the interference field; for this purpose, standard color filters 164, 165, 166 and deflection mirrors 160, 161, 163 are used. The R, G, B signals thus represent a three-point sampling step of the spectral intensity curve corresponding to the image point of the interference field just sampled. The local phase difference between the interfering light beams is derived from these values, as will be described in detail further on.

The determination of the local phase difference for each image point of the interference field may be effected either by processing the R, G, B signals as such or by processing the signals luminance Y (the image content corresponding to the black-and-white structure of the image) and chrominance (the chromaticity at which the components receive their hue and color saturation). Both signals represent linear combinations of the R, G, B signals and are combined with a blanking and synchronizing signal to form a so-called FBAS signal, by means of which a color monitor may be controlled, for example.

The example according to FIG. 1 uses the linear combinations of the R, G, B signals which essentially correspond to the luminance and chrominance signals and which are generated in the electronic circuits 171, 172, 173 illustrated as a block diagram. Circuit 171 generates the sum of the three color separations R+B+G analogously to the luminance signal, whereas circuits 172 and 173 generate the two combinations R−½(B+G) and (B−G). Circuit 171, 172, 173 may also represent conventional TV circuits, as are contained, for example, in the commercially available TV camera 16. In such a case, the sum $$Y = 0.3R + 0.59G + 0.11B$$

is generated for representing the luminance signal; also generated are the two color difference signals R−Y and B−Y. The combined output signal of the correspondingly modified circuits 171, 172, 173 may subsequently be used to directly transmit, for instance, the sampled interference field on bus 181 to a color TV monitor 18.

According to the invention, the output signals of the circuits 171, 172, 173 are in each case fed to an analog-to-digital converter 174, 175, 176 which generates a digital value corresponding to the current analog value of the TV signal components. The binary numbers at the output of the converters 174, 175, 176 determine in their totality the local phase difference of the interfering waves of the image point just tested. For each possible combination of the R, G, B signals (or the TV signals derived therefrom) a storage 177 contains the associated phase differences or layer thicknesses; the respective storage location is read as a function of the binary signals of the analog-to-digital converters 174, 175, 176, which are used as address signals.

The output lines 184 of the electronic random access storage RAM 177 (which may also be a read-only storage ROM) thus provides the binary representation of the local phase difference or the local layer thickness at the respective TV image point sampled. If a read/write storage is used, a digital processor may be connected by line 193 to up-date the storage contents and thus to adapt the camera to changed surroundings, for example, another interferometer beam path.

The binary value on the output lines 184 may also be fed on a bus 183 to a digital computer 19 (or an image evaluator) for further processing. If the local phase differences of the interfering light beams are to be visually represented, the digital value on lines 184 is converted by one or several digital-to-analog converters 182 into a signal for controlling a color TV monitor 18 (so-called false colors), so that the points of the interference field with the same phase differences appear as isochromatic points, for instance, in the form of contour lines, on the monitor 18. This contour line pattern may be represented concurrently with the image of the interference field (transmitted on line 181).

These artificially generated contour line (or layer thickness) patterns resemble the interference images occurring in monochromatically illuminated interference arrangements and which are therefore referred to as "pseudo-interference fringes". The information content of such fringes may considerably exceed that of conventional interference images, as the output lines 184 contain all data on the local parameters of the interference field (such as absolute value of layer thickness, sign of layer thickness change, etc.). For example, ascending or descending portions of the tested surface may be represented in the pseudo-interference field by generating in lieu of a single contour line double lines, one line of which (for instance, of a different color) is located on the ascending portion. Very simple pseudo-interference fields, corresponding to the optical interference fields, are encountered if only those points of the tested surface are indicated where a local phase difference of - exists at that time. In such a case, the necessary storage capacity is very small, as only one bit has to be stored for each R, G, B combination.

The color TV camera, the A/D converters, the storages, the D/A converters, and the monitor operate synchronously and are, for example, controlled by a synchronization control 190 through synchronizing line 191. For compensating for the slight time loss occurring during the processing of the R, G, B signals, the synchronizing signal for monitor 18 may be suitably delayed.

The number of interference orders resolvable during evaluation depends on the bandwidth of the respective color channel in the camera 16. For limiting the spectral range recorded by the pick-up tubes R, G and B, the color separation filters (160, 161, 163) may be exchanged in the camera itself; it is also possible to position an interference filter 15, having very narrow pass ranges in the red, green and blue parts, in front of the camera. Such "multiple interference filters" may be produced, for example, as a Fabry-Perot set-up.

The evaluation of a white light interference field, as proposed herein, depends to a slight degree on the color temperature of the object 13 tested. To compensate for that effect, the color temperature may be separately measured and taken into account as a correction factor (either by suitably influencing the input signals for the analog-to-digital converters 174, 175, 176 or by correcting the output values 184). A further correction may be necessary for multiple interferences where the phase difference of the interfering light beam is not only determined by the layer thickness (e.g., the air gap between glass plate 12 and surface 13) but also by the refractive indices of the reflecting surfaces. Corrections are also necessary for reflections at metallic surfaces, as it is on these that a phase jump occurs. In such cases, too, the read value 184 may be corrected, for example, by means of a connected processor 19. The respective correction values required may also be stored in a separate correction storage which would also receive the output signals from the A/D converters 174, 175, 176; the corrections derived from that storage are subsequently added to the output signals 184 by means of suitable adder circuits.

The components used for the electronic evaluator circuit, i.e. the analog-to-digital converters 174, 175, 176, the storage 177, the digital-to-analog converter 182 and the computer 19 are commercially available components. The processing speed of the converters used and the storage access speed must, however, be sufficiently high if real time evaluation is required for the sampled interference image; if necessary, the synchronizing and deflection signals of the FBAS signal may also be delayed to compensate for the time loss incurred by converting the luminance and chrominance components by means of the storage. The storage capacity required is relatively low, amounting, for example, to 32K storage positions (bytes or words) if the three analog signals used for addressing are converted into a binary number consisting in each case of five bits. Such storage capacities may be obtained without any difficulties with access times of several 10 nanoseconds.

The method of computing layer thicknesses from three measured color signals R, G, B will subsequently be explained with reference to a simple example providing for a thin transparent layer to be perpendicularly illuminated with white light. The selection between the primary colors R, G, B and the color of an object used for that purpose are described in detail, for example, in the article by H. Kubota in "Progress in Optics", Vol. 1, 1961, p. 213 et seq.

The following equation holds for the wavelength-dependent reflectivity r of a thin layer $$r = \frac{r_1^2 + r_2^2 + 2r_1r_2\cos\delta}{1 + r_1^2 r_2^2 + 2r_1r_2\cos\delta} \quad (1)$$

where the coefficients of reflection $r_1$ and $r_2$ for the top and the bottom boundary film of that layer are defined as $$r_1 = \frac{n_1 - n}{n_1 + n} \quad r_2 = \frac{n - n_2}{n + n_2} \quad (2)$$

The variable $\delta$ is defined as $4\pi(nd)/\lambda$; n is the refractive index of the layer, $n_1$ and $n_2$ are the refractive indices of the medium lying above or below the layer. The numerator of equation (1) represents the interference of two plane waves with a mutual phase difference of $\delta$, the denominator results from multiple interferences and distorts the cosine-shaped reflectivity curve as a function of the wavelength or the layer thickness, which is obtained if only the numerator is taken into account.

The three output signals of the color TV camera thus are $$B = I_o(\lambda_B) r_B$$

$$R = I_o(\lambda_R) r_R$$

$$G = I_o(\lambda_G) r_G \quad (3)$$

if $I_o(\lambda_i)$ is the intensity of the incident light at the respective wavelength and $r_i$ is the reflectivity of the layer at the considered wavelengths R, G, B. The computation of these R, G, B values by means of the layer thickness d as a parameter yields a curve in an orthogonal coordinate system, along whose axes the intensities of the three primary colors are plotted. Inversely, the associated point of the above-computed parameter curve, which determines the layer thickness, may be established for each measured color triple R, G, B in that coordinate system. As the measured color values R, G, B are also used to address storage 177, the entire address space of this storage may be conceived of as a cube with the edges R, G, B; in this case, each number triple designates an elementary cube inside the address space in which the associated layer thickness is stored.

Figure 2:
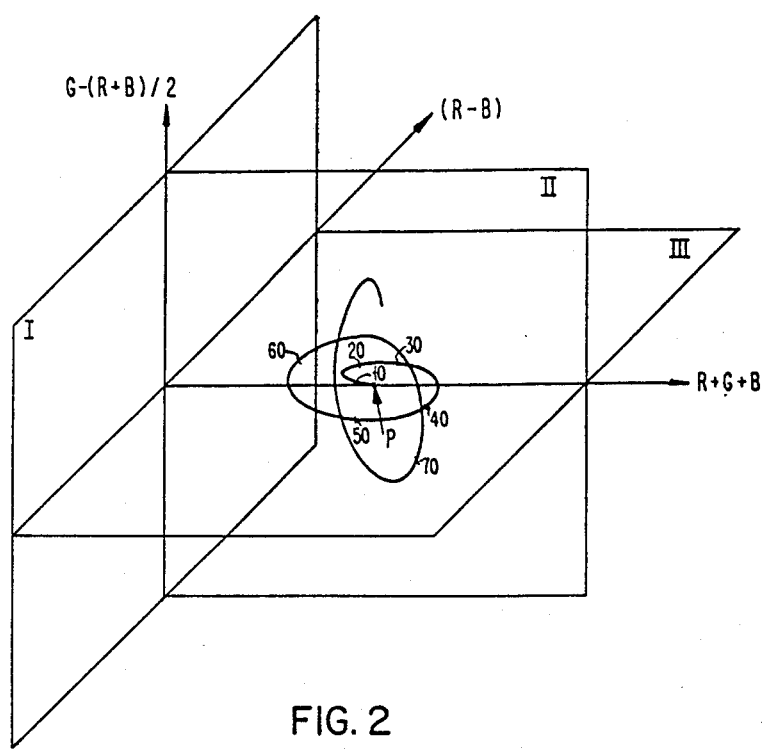
FIG. 2 is a schematic example of a spatial curve of the phase difference, as is used as a basis for an arrangement according to FIG. 1.

Instead of the three primary colors it is possible to use their linear combinations as a basis for the above considerations. For this purpose, FIG. 2 shows a perspective view of an orthogonal coordinate system, whose axes are the previously explained linear combinations of the primary colors R, G, B. The above-described local curve of the layer thicknesses associated with particular R, G, B combinations is represented in this system of axes as a curve progressing from a point P with increasing layer thicknesses. Point P corresponds to the chromaticity of the light source used for measuring. As the distance of the curve points from point P increases, the ordinal number of the associated interference increases, too; examples (not true-to-scale) of layer thicknesses are shown in nm along the curve.

Figure 3A:
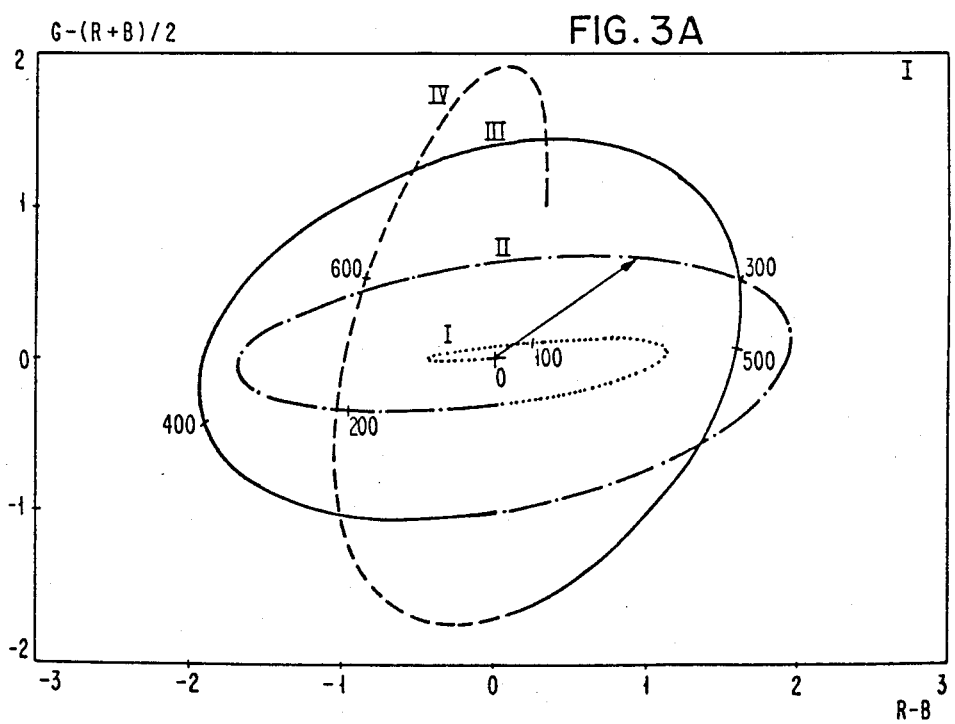
FIGS. 3A, 3B and 3C are projections of the curve of FIG. 2 on three coordinate planes.
Figure 3B:
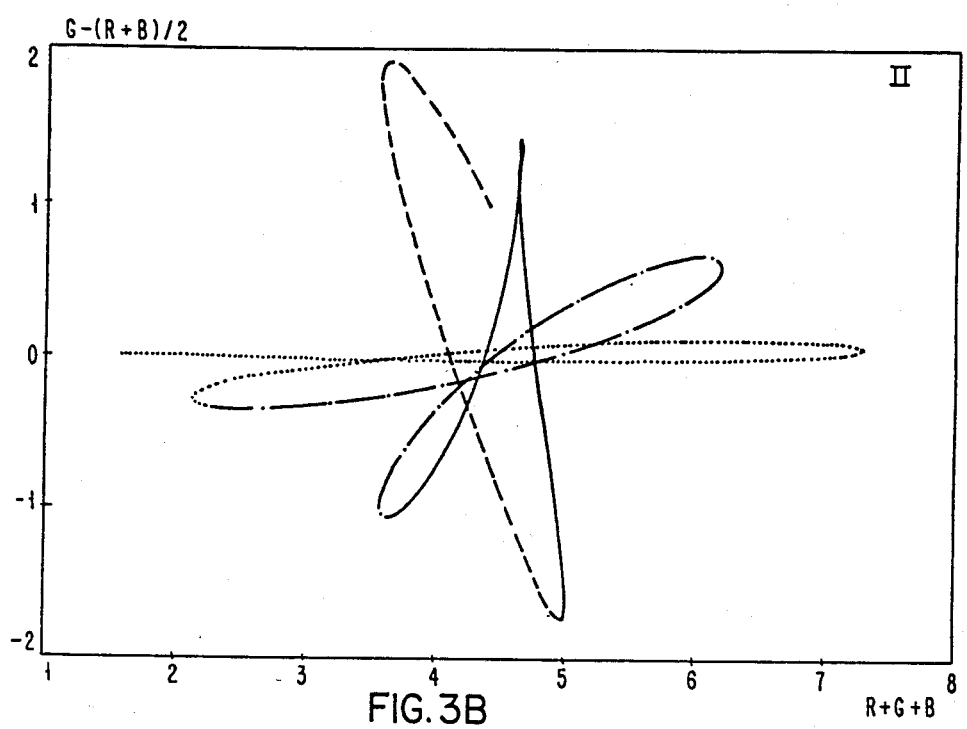
Figure 3C:
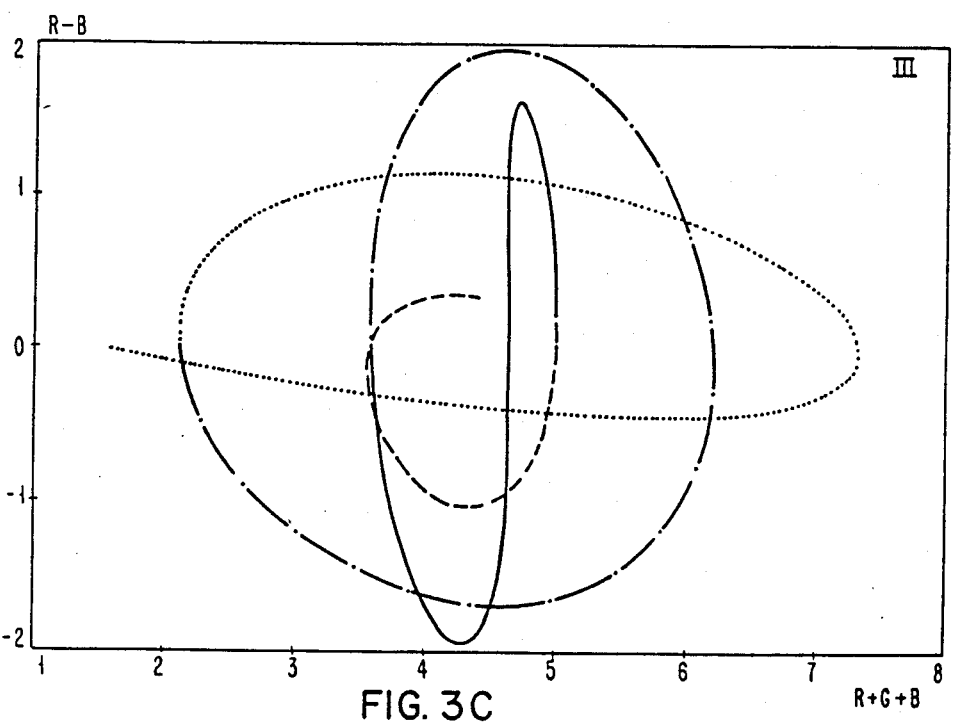

A computed example of such a curve is shown in FIGS. 3A to 3C, each of which corresponds to projections of the spatial curve of FIG. 2 on planes I, II, III including the coordinate axes of FIG. 2. Curve sections corresponding to different interference orders are emphasized by being differently represented (by broken lines, dotted lines, etc.).

The curve according to FIG. 2 or FIG. 3, that is actually required for a particular application, must be computed in accordance with the interference conditions existing at that stage. Examples of parameters to be considered are:

single or multiple interference,
perpendicular or oblique incidence,
the individual refractive indices,
the occurrence of metallic reflection layers, etc.

This computation may be effected, for example, in processor 19 which transmits the results on line 193 (that may be optionally connected) to storage 177.

The projections of the spatial curve of FIG. 2 on the illustrated coordinate planes show intersections, so that if only one projection is considered in isolation, it is impossible to uniquely associate a curve point with a particular layer thickness. In such cases, the other projections have to be referred to for uniquely determining a layer thickness, for example, by considering the interference order. For this purpose, the data in storage 177 are arranged such that a table with the layer thickness is addressed as a function of the measured hue. The color saturation and the luminance serve to address the interference order number.

According to the previous explanations, only those combinations of R, G, B signals in the coordinate system of FIG. 2 (and the associated locations in the storage address space) have to be filled with values with which a layer thickness may be associated by computation. In practice, however, as a result of inevitable measuring errors, the measured R, G, B combinations do not only lead to the defined points but also to other points of the address space cube, with which no layer thickness is associated. In order to be able to determine a layer thickness also for those measurements, it is necessary that the areas in the vicinity of the computed spatial curve of FIG. 2 be also filled with values. The association of a measuring triple R, G, B with a layer thickness may be effected such that that layer thickness is chosen which corresponds to the shortest spatial distance of the measuring point from the spatial parameter curve. The associated layer thickness is then also entered into that storage position of the address space.

As the number of resolvable interference orders increases as the bandwidth of the individual color channels R, G, B decreases, it is advantageous for unique measurements to employ the previously mentioned interference filter 15 having very small pass ranges.

What is claimed is:

1. An optical interferometer comprising means for causing at least two white light beams to interfere, a color TV camera having R, G, B output signals corresponding respectively to the phase differences of the red, green and blue light of the interference field from the interfereing white light beams, and means for evaluating the R, G, B output signals, said evaluating means further comprising means for storing the R, G, B output signals or linear combinations thereof.

2. An interferometer according to claim 1, the evaluating means further comprising means between the TV camera and the storing means for converting the analog R, G, B output signals, or linear combinations thereof, to digital signals.

3. An interferometer according to claim 2 further comprising a TV monitor and digital-to-analog converter means connecting the storing means to the TV monitor.

4. An interferometer according to claim 2 further comprising a digital processor connected to the output of the storing means.

5. An interferometer according to claim 4, wherein the storing means is a read/write storage.

6. An interferometer according to claim 2 wherein the storing means is a read-only storage.

7. An interferometer according to claim 1 wherein the evaluating means further comprises means for generating the following linear combinations of the R, G, B output signals:
R+B+G,
R−½(B+G), and
B−G.

8. An interferometer according to claim 1 further comprising means for generating the TV camera output signals (R, G, B) as narrow band spectral ranges.

9. An interferometer according to claim 8 wherein said spectral band generating means further comprises an interference filter having narrow pass ranges for the primary colors, the filter being located between the interference source and the camera light input.

* * * * *